Oct. 23, 1923.
F. V. WIDGER
1,471,509
CONTINUOUS REVERSING DRIVE
Filed Jan. 30, 1922
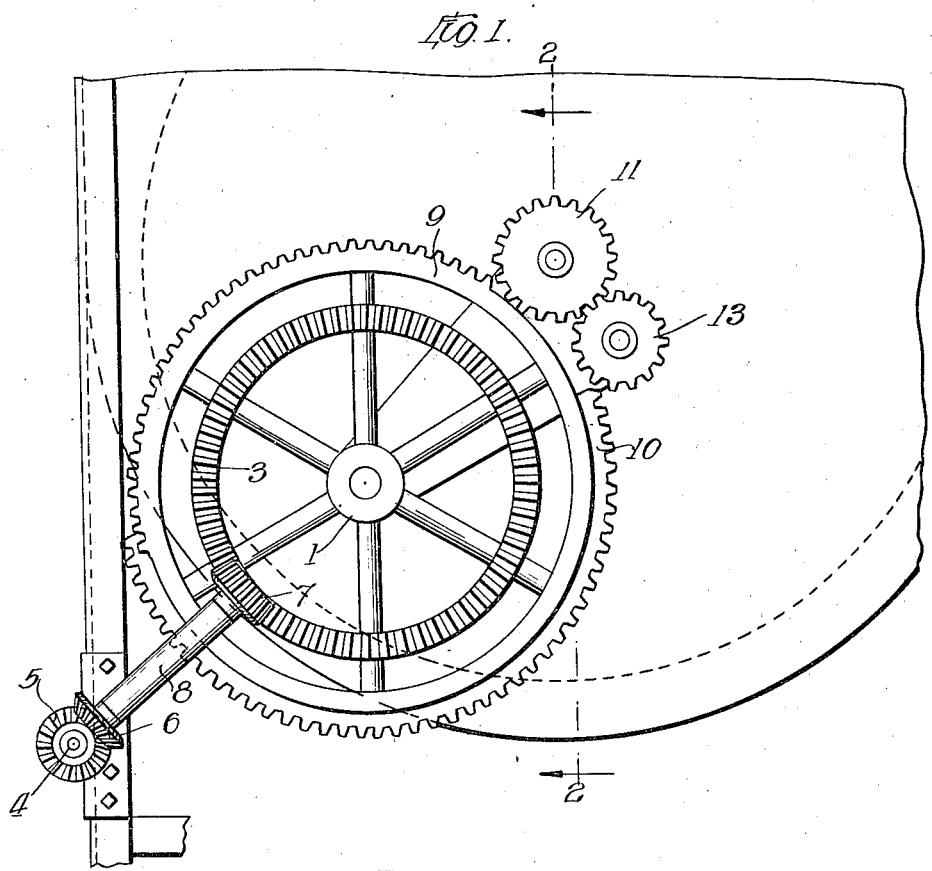
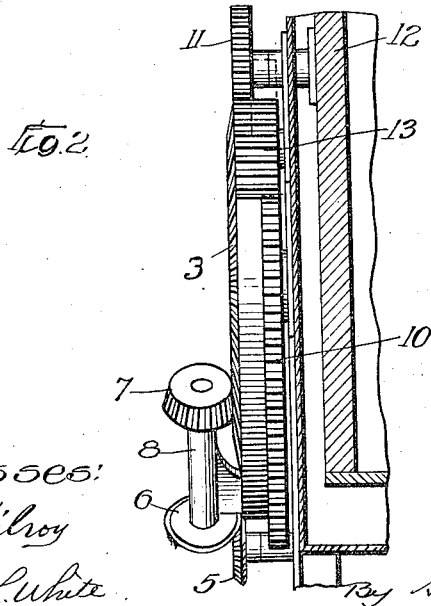
Witnesses:
W. F. Kilroy
Harry R. L. White
Inventor:
Frank V. Widger
By Kent W. Nownell Atty.

Patented Oct. 23, 1923.

1,471,509

UNITED STATES PATENT OFFICE.

FRANK V. WIDGER, OF CHICAGO, ILLINOIS.

CONTINUOUS REVERSING DRIVE.

Application filed January 30, 1922. Serial No. 532,559.

*To all whom it may concern:*

Be it known that I, FRANK V. WIDGER, a citizen of the United States, residing at Chicago, in the county of Cook and State of Illinois, have invented certain new and useful Improvements in a Continuous Reversing Drive, of which the following is a specification.

This invention relates to a driving mechanism particularly designed and intended for use in connection with washing machines although it may have a more general use wherever applicable. The principle object of the invention is to provide a continuous driver which engages periodically with either one of a pair of connected gears for operating a driven member for a predetermined time in one direction and then reversing the motion for approximately the same time. One of the principal features of the invention is to accomplish this reversal without employing any reversing levers, arms, springs or other devices. The invention consists in the novel construction, combination and arrangement of the several parts.

In the accompanying drawing, Fig. 1 is a side elevation illustrating the invention as applied to a washing machine; and Fig. 2 is a section taken on the line 2—2 of Fig. 1.

In operating a washing machine and many other mechanisms it is desirable to move or rotate one of the parts for a period in one direction and then automatically to reverse and operate it in the other direction. Most of the mechanisms which are employed to accomplish this result comprise a number of levers, gears, springs and other mechanical devices for effecting the reversal, and sooner or later one of the chain of such devices impairs or prevents the proper functioning of the parts.

The present invention comprises a simple continuous driver 1 which is mounted for the rotation at the outside of a washing machine or other housing 2 to which it is applied, and this driver is provided either with a pulley or a continuous gear 3 which is driven from a power shaft 4 by means of a gear 5 and gears 6 and 7 connected to a cross shaft 8.

At the periphery of this driving member 1 are two gear segments 9 and 10 which may be of the same or different diameters but are located out of line with respect to each other. One of the segments 9 is adapted to engage with a driving gear 11 which may be directly connected to a rotatable member 12 of the washing machine or any other device to which the mechanism is applied. The other segment 10 is adapted to engage with a gear 13 which also meshes with the gear 11.

These gear segments 9 and 10 are so disposed on the driving member that as soon as one of the gears 11 or 13 becomes disengaged from its driving gear segments 9 or 10, the segment for the other gear is in position to engage it so that the movement of the gears 11 and 13 is reversed. This necessitates that at one side of the driving member 1, the gear segments 9 and 10 shall be spaced apart a distance slightly greater than the distance between the axes of the gears 11 and 13 while the opposite ends of the segments will overlap an amount somewhat less than the distance between the axes of the gears 10 and 13. The reason for this is that the driver 1 moves continuously in the same direction and if it is desired to quickly reverse the motion of the member 12 and the gear 11, the gear segment 10 of the gear 13 must be advanced slightly to engage the gear soon after the gear 11 runs off from its segment 10. If a longer period is desired between the reversing movements it is necessary only to increase the distance apart of the adjacent ends of the gear segments 9 and 10.

With this construction it is apparent that the reversing action can be effected completely and automatically with only the three driving members, the driver 1 and the two gears 11 and 13. There is nothing to get out of order and nothing to get broken. The operation is simple and very efficient. The driven member 12 may be operated at the same speed in both directions, or at different speeds for different durations by varying the proportions of the gears 11 and 13 and the gear segments 9 and 10.

I claim:

1. The combination with a rotatable member, of a pair of segmental gears at the periphery thereof, a pair of meshing gears each engaging one of the segmental gears, and a member connected to one of the meshing gears for alternately reversing movement therewith.

2. In reverse mechanism, a continuously driven member, a pair of gear segments at the outside of the periphery thereof out of line with each other, a pair of intermeshing gears each of which meshes with one of the segmental gears at a predetermined time, and a rotatable member connected to one of the gears which is reversely driven thereby.

3. In a reversing mechanism, the combination with a rotatable member constantly driven in the same direction, of segmental gears mounted at the outer side of the periphery thereof and out of line with each other with a space between adjacent ends of the segments, and a pair of directly connected gears one adapted to engage with each gear segment so that the gears are driven reversely in accordance as each one engages its corresponding gear segment.

4. In a reversing mechanism, a rotatable member continuously driven in the same direction, a pair of gear segments at the periphery thereof and of alinement with each other and overlapping at one of their adjacent ends, a pair of meshing gears each adapted to engage one of the segments and rotating reversely and depending upon which one of the gears meshes with its segment.

5. The combination with a rotatable member continuously driven in one direction, of a pair of gear segments out of alinement with each other, one of the adjacent ends of the segments being spaced apart and the opposite ends of the segments overlapping, and a pair of meshing gears each of which is adapted to be engaged separately by one of the gear segments rotating the other one accordingly.

6. The combination with a continuously operated driving member and a reversible driven member, of a pair of segmental gears carried by the driving member, and a pair of rotatable meshing gears for connecting the driving and driven members, the segmental gears being out of alinement and each engageable by one of the other gears, and the segmental gears being spaced apart a distance greater than the distance between the axes of the other gears at one end, and overlapping a distance less than that between the said axes at the other ends of the segmental gears.

FRANK V. WIDGER.